(12) United States Patent
Pezeshkian et al.

(10) Patent No.: US 8,427,383 B1
(45) Date of Patent: Apr. 23, 2013

(54) NEXT GENERATION AUTOMATICALLY-DEPLOYED COMMUNICATION RELAY

(75) Inventors: Narek Pezeshkian, San Diego, CA (US); Aaron Bruce Burmeister, San Diego, CA (US); Hoa G. Nguyen, San Diego, CA (US); Kevin F. Holz, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 919 days.

(21) Appl. No.: 12/503,170

(22) Filed: Aug. 17, 2009

(51) Int. Cl.
*H01Q 3/00* (2006.01)
*H01Q 1/24* (2006.01)
*H01Q 3/02* (2006.01)

(52) U.S. Cl.
USPC ............ 343/757; 343/766; 343/702; 343/882

(58) Field of Classification Search .................. None
See application file for complete search history.

(56) References Cited

U.S. PATENT DOCUMENTS

| | | | | |
|---|---|---|---|---|
| 2,790,171 | A | * | 4/1957 | Waldorf et al. ............... 343/886 |
| 2,909,776 | A | * | 10/1959 | Morse et al. .................. 343/709 |
| 3,288,402 | A | | 11/1966 | Icenbice et al. |
| 4,292,861 | A | * | 10/1981 | Thornhill et al. ........... 74/813 R |
| 5,392,054 | A | * | 2/1995 | Bottomley et al. ........... 343/702 |
| 5,517,204 | A | * | 5/1996 | Murakoshi et al. ........... 343/765 |
| 5,734,716 | A | * | 3/1998 | Kulberg .................... 379/433.13 |
| 7,437,051 | B1 | * | 10/2008 | Cook et al. ..................... 385/147 |
| 7,586,463 | B1 | * | 9/2009 | Katz ............................. 343/895 |
| 2005/0036622 | A1 | | 2/2005 | Hay et al. |

OTHER PUBLICATIONS

H. G. Nguyen, N. Pezeshkian, M. Raymond, A. Gupta, J. M. Spector; Autonomous Communication Relays for Tactical Robots; Proceedings of ICAR 2003, The 11th International Conference on Advanced Robotics Coimbra, Portugal, Jun. 30-Jul. 3, 2003.

Hoa G. Nguyen, Nathan Farrington, and Narek Pezeshkian; Maintaining Communication Link for Tactical Ground Robots; AUVSI Unmanned Systems North America 2005, Anaheim, CA, Aug. 3-5, 2004.
Unpublished U.S. Appl. No. 11/832,103, filed Aug. 1, 2007, by Aaron Burmeister et al., titled "Relay Device Deployer System."
Unpublished U.S. Appl. No. 11/832,065, filed Aug. 1, 2007, by Aaron Burmeister et al., titled "Wireless, Self-Contained Relay Device."
Sarnoff Corporation; Tactical Military Communications for Subterranean & Urban Environments (CSUE); available on the internet at: http://www.sarnoff.com/downloads/research-and-development/video-communications-networking/communications-networking/ad-hoc-networking/CSUE_military_ds.pdf; believed to have been posted on the internet on Nov. 10, 2007.
N. Pezeshkian, H. G. Nguyen, and A. Burmeister; Unmanned Ground Vehicle Radio Relay Deployment System for Non-Line-of-Sight Operations; 13th IASTED International Conference on Robotics & Applications, Wurzburg, Germany; Aug. 29-31, 2007.

* cited by examiner

*Primary Examiner* — Jacob Y Choi
*Assistant Examiner* — Graham Smith
(74) *Attorney, Agent, or Firm* — Kyle Eppele; J. Eric Anderson

(57) ABSTRACT

A radio relay comprising: a housing configured to be released from a mobile platform onto a support surface; a radio mounted within the housing, wherein the radio is configured to relay radio frequency (RF) signals and to operate as a node in a telecommunications network; a first antenna mast having a proximal end and a distal end, wherein the proximal end is rotatably coupled to the housing; a first antenna element operatively coupled to the radio and mechanically coupled to the distal end; and an antenna mast rotation mechanism mounted within the housing and the proximal end such that the antenna mast rotation mechanism is configured to upwardly rotate the first antenna mast to a raised position such that the first antenna mast is substantially parallel to the ambient gravity vector.

8 Claims, 6 Drawing Sheets

NEXT GENERATION AUTOMATICALLY-DEPLOYED COMMUNICATION RELAY

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, San Diego, Code 72120, San Diego, Calif., 92152; voice (619) 553-2778; email T2@spawar.navy.mil. Reference Navy Case Number 99526.

BACKGROUND OF THE INVENTION

Maintaining communications between mobile platforms in non-line-of-sight conditions can be problematic. Buildings, trees, hills, and other obstructions negatively reflect, distort, and/or absorb radio signals. A need exists for a wireless, non-line-of-sight, high-bandwidth deployable relay device.

BRIEF DESCRIPTION OF THE DRAWINGS

Throughout the several views, like elements are referenced using like references. The elements in the figures are not drawn to scale and some dimensions are exaggerated for clarity. It is to be understood that the drawings are submitted as example embodiments only and that the Next Generation Automatically-Deployed Communications Relay is not limited to the embodiments and configurations depicted in the drawings.

DETAILED DESCRIPTION OF EMBODIMENTS

Figure 1:
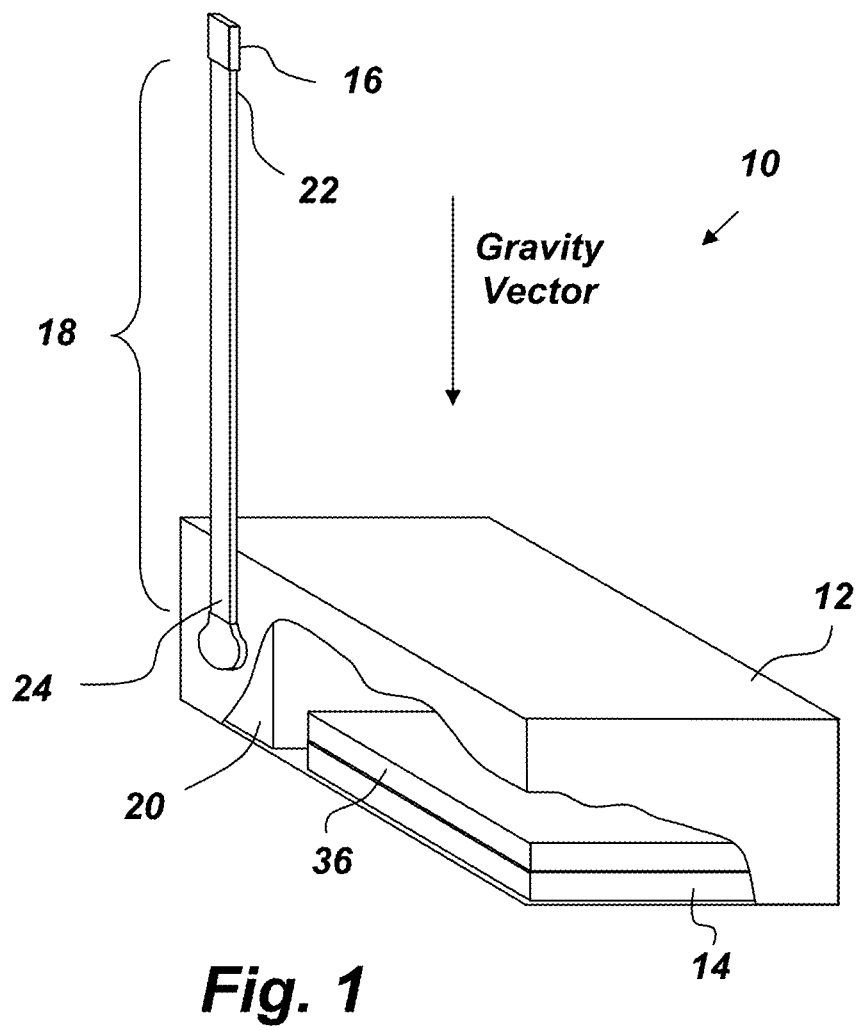
FIG. 1 shows a perspective view of an embodiment of a radio relay.

FIG. 1 shows an embodiment of a radio relay 10. As shown, the radio relay 10 comprises a housing 12, a radio 14 mounted within the housing 12, a first antenna element 16, a first antenna mast 18, and an antenna mast rotation mechanism 20. The radio 14 and the rotation mechanism 20 are mounted within the housing 12. The first antenna mast 18 has a distal end 22, and a proximal end 24. The first antenna element 16 is operatively coupled to the radio 14 and mechanically coupled to the distal end 22 of the first antenna mast 18. The proximal end 24 of the first antenna mast 18 is rotatably coupled to the housing 20 and the rotation mechanism 20 such that the antenna mast rotation mechanism 20 is configured to upwardly rotate the first antenna mast 18 to a raised position such that the first antenna mast 18 is substantially parallel to the ambient gravity vector.

Figure 2:
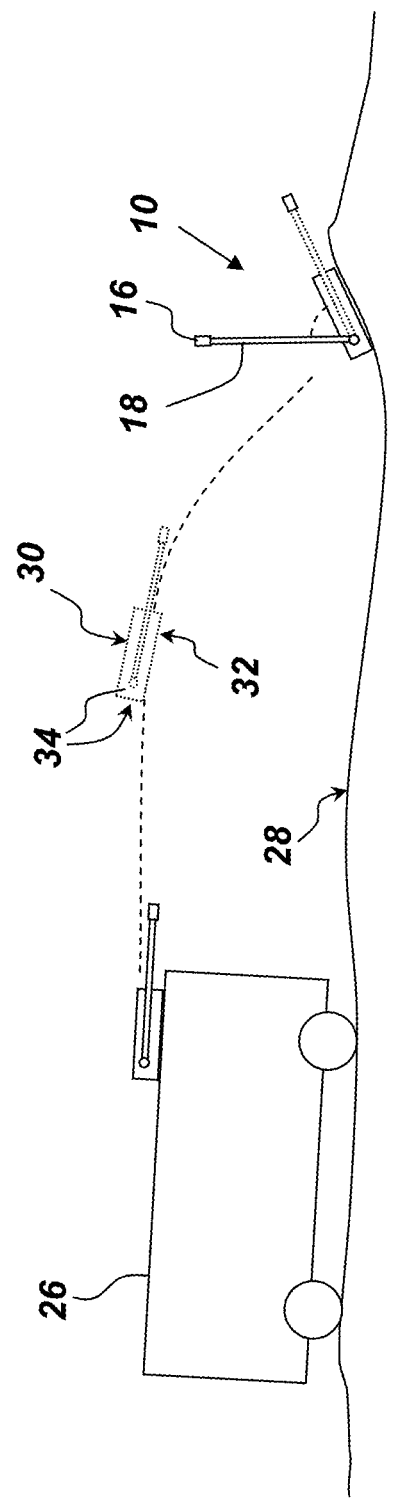
FIG. 2 is a side view of a radio relay being deployed from a mobile platform.

FIG. 2 illustrates how the housing 12 may be configured to be released from a mobile platform 26 onto a support surface 28. The housing 12 may be transferred from the mobile platform 26 to the support surface 28 in any conceivable way. For example, the housing 12 may be ejected, dropped, placed, or embedded onto the support surface 28. The support surface 28 may be any surface (e.g. land or sea) capable of supporting the relay radio 10 and the mobile platform 26. The mobile platform 26 may be manned or unmanned and may be any platform capable of carrying the radio relay 10 and moving over the support surface 28. Some suitable examples of the mobile platform 26 include, but are not limited to: an automobile, a water craft, an autonomous robot, a remote-controlled robot, an animal (such as a rescue/security animal), or a human being.

As shown in FIG. 2, the housing 12 comprises an upper surface 30, a lower surface 32, and at least one side 34. It is to be understood that while FIGS. 1 and 2 depict the housing 12 as a rectangular prism, the housing 12 may be any desired size or shape that is capable of containing the radio 14 and the antenna mast rotation mechanism 20. After being deployed from the mobile platform 26, the radio relay 10 may bounce, roll, and or rock on the support surface 28 before it comes to rest. The radio relay 10 may be constructed such that the housing 12 comes to rest on the upper surface 30 or the lower surface 32 after being deployed from the mobile platform 26. For example, in the embodiment shown in FIG. 2, the upper and lower surfaces 30 and 32 respectively are larger than the sides 34, making it more likely that the housing 12 will come to rest on either the upper surface 30 or the lower surface 32. In another example, the housing 12 may be weighted so as to allow the radio relay 10 to come to rest on a desired surface. Any other means or configuration may be employed to cause the housing 12 to come to rest in a particular orientation on the support surface 28.

FIG. 2 also shows that the first antenna mast 18 is rotatably coupled to the side 34 in such a way as to allow the antenna 18 to be upwardly rotated once the housing 12 comes to rest on the support surface 28. No matter how the housing 12 is oriented after coming to rest on the support surface 28, the radio relay 10 is configured to upwardly rotate the antenna mast 18 until the antenna mast 18 is substantially parallel with the ambient gravitational field vector. As shown in FIG. 2, the support surface 28 need not be level.

Referring back to FIG. 1, the radio relay 10 may optionally comprise a three-axis accelerometer 36 mounted within the housing 12 and operatively coupled to the antenna mast rotation mechanism 20. The three-axis accelerometer 36 may be used to determine proper antenna mast 18 alignment and to detect vibrations in the support surface 28. Depending on which way the radio relay 10 lands, the antenna mast rotation mechanism 20 rotates the first antenna mast 18 so that the antenna mast 18 is raised to the nearly optimal position above the support surface 28 as determined by the radio relay 10 through the use of the three-axis accelerometer 36.

Figure 3A:
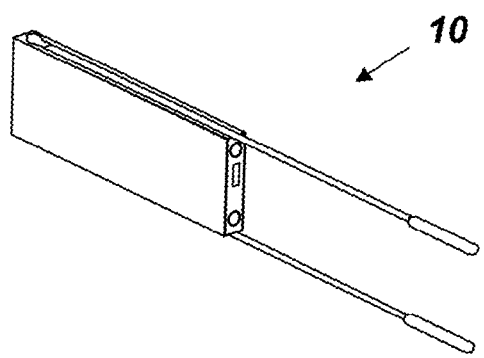
FIG. 3(a) is a perspective view of an embodiment of the radio relay in a stowed position.
Figure 3B:
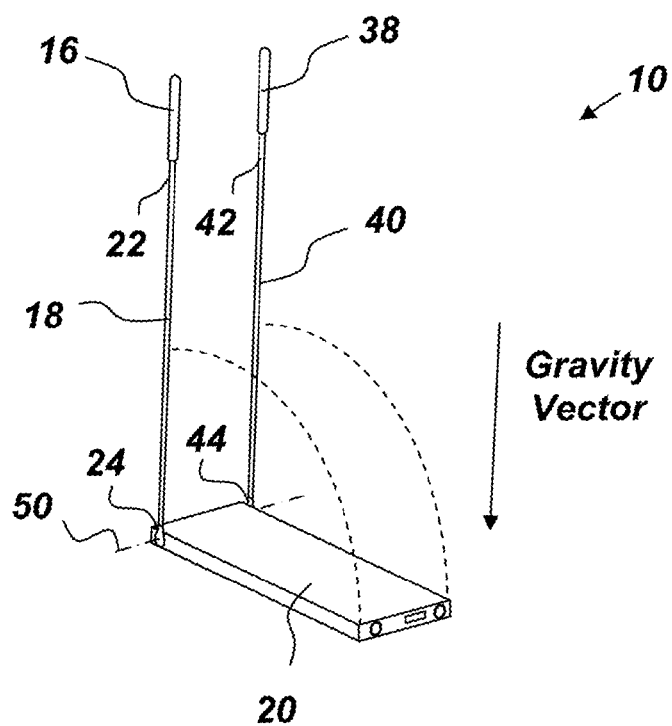
FIG. 3(b) is a perspective view of an embodiment of the radio relay with raised antennas.

FIGS. 3(a) and 3(b) show perspective views an embodiment of the radio relay 10 further comprising a second antenna element 38 coupled to a second antenna mast 40. The second antenna mast 40 comprises a distal end 42 and a proximal end 44. FIG. 3(a) shows the radio relay 10 in a stowed position. FIG. 3(b) shows the radio relay 10 with first and second antenna masts 18 and 40 rotated into a position that is substantially parallel with the ambient gravity vector. The embodiment of the radio relay 10 shown in FIG. 3, supports diversity antenna connection. This is accomplished by employing the first and second antenna masts 18 and 40, which are mechanically linked to the antenna mast rotation mechanism 20 (shown in FIG. 1). The first and second antenna elements 16 and 38 are coupled to the distal ends 22 and 42 of the first and second antenna masts 18 and 40 respectively. In operation, the antenna masts 18 and 40 may be hollow so as to allow RF coaxial cables, one from each of the first and second antenna elements 16 and 38, to pass through the antenna masts 18 and 40, ending in a right-angel RF connector (not shown) at the proximal ends 24 and 44. The right-angle RF connectors on the proximal ends 24 and 44 may be plugged into and securely mounted to an external interface of the antenna mast rotation mechanism 20 (not shown). This external interface allows the first and second antenna elements 16 and 38 to connect to the onboard radio 14 inside the housing 12 via a series of RF connectors.

Figure 4:
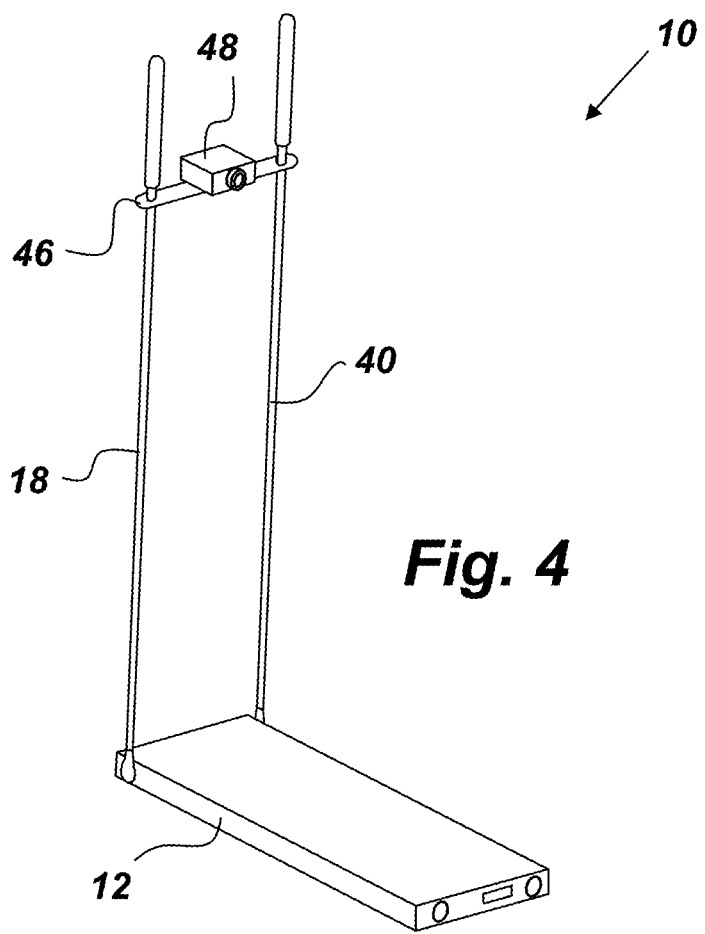
FIG. 4 is a perspective view of another embodiment of the radio relay.

FIG. 4 shows another embodiment of the radio relay 10 with an optional cross bar 46 mounted between the distal ends 22 and 42. The cross bar 46 contributes to antenna strength and allows the radio relay 10 to be more easily retrieved. In addition, the first and second antenna masts 18 and 40 can optionally be used to support a sensor 48, which can be placed above the support surface 28 for improved operation. The sensor 48 may be any sensor capable of sensing a desired aspect of the environment. For example, the sensor 48 may be a video camera mounted on the crossbar 46 with cabling running down the hollow first and second antenna masts 18 and 40 and into the radio 14—thus enabling the radio relay 10 to not only relay wireless data but also a video stream. Multiple radio relays 10 equipped with video cameras can provide video from various vantage points as desired.

The antenna mast rotation mechanism 20 is capable of raising the two masts 18 and 40. The two antenna masts 18 and 40 may be physically linked together. In one example embodiment, the antenna mast rotation mechanism 20 employs an electronically controlled servo motor. The servo motor in this example is linked to the two masts 18 and 40 by a gear reduction system. This arrangement provides a single degree of freedom (DOF) for the rotation of the antenna masts 18 and 40 about a rotational axis 50. Once the antenna mast rotation mechanism 20 has positioned the first and second antenna masts 18 and 40 to be substantially parallel to the ambient gravity vector an antenna friction brake may be used to hold the first and second antenna masts 18 and 40 in position. In one example embodiment, the antenna friction brake may comprise an elastic member in frictional contact with a shaft connecting the first and second antenna masts 18 and 40. The strength with which the antenna friction brake holds the two masts 18 and 40 may be varied by adjusting the elasticity of the elastic member or varying the number of elastic members.

The radio relay 10 is configured to be stored on the mobile platform 26 with the antenna masts 18 and 40 in positions that are parallel to the length of the housing 12, as shown in FIG. 3(a). Due to the shape of the housing 12, once the radio relay 10 is deployed from the mobile platform 26, it will either land on its upper surface 30 or lower surface 32. Once the radio relay 10 comes to rest on the support surface 28, the three-axis accelerometer 36 measures the components of the gravity vector along each of its three axes. Using these components a mast rotation angle is determined such that when rotated to this angle the antenna masts 18 and 40 will be substantially parallel to the gravity vector. Position feedback of the antenna mast rotation mechanism 20 may be obtained using any means known to those having ordinary skill in the art. As a non-limiting example, position feedback of the antenna mast rotation mechanism 20 may be obtained by using an absolute encoder that may be embedded in the servo motor's drive axis. The absolute encoder is comprised of an integrated circuit that reads the rotational position of a magnet that is securely fastened to the gear located on the servo motor.

Figure 5A:
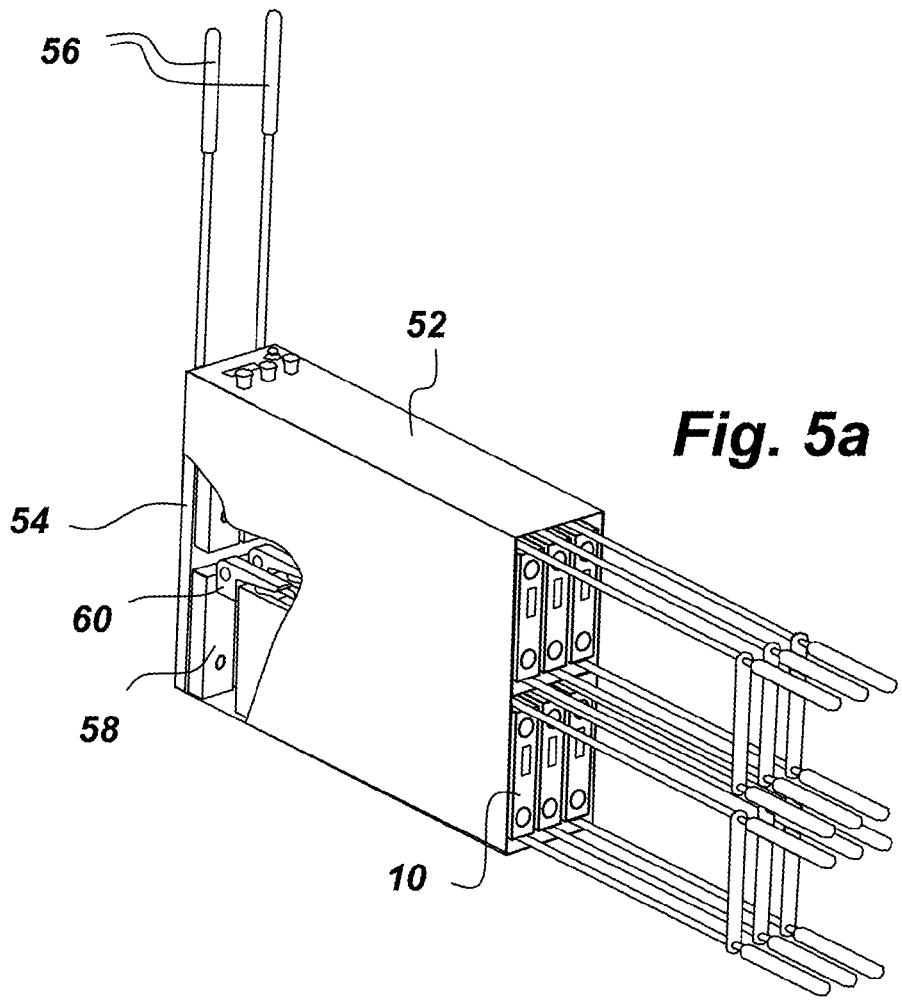
FIG. 5(a) is a perspective, cut-away view of radio relays stored in a deployer.

FIG. 5(a) shows a perspective, cut-away view of multiple radio relays 10 stowed in a deployer 52. The deployer 52 may be mounted on the mobile platform 26 and may comprise a deployer radio 54 with dual antennas 56. Any desired number of radio relays 10 may be stowed in the deployer 52. For each radio relay 10 held by the deployer 52, the deployer 52 has a corresponding infrared data association (IrDA) transceiver 58 and a deployment mechanism 60.

Figure 5B:
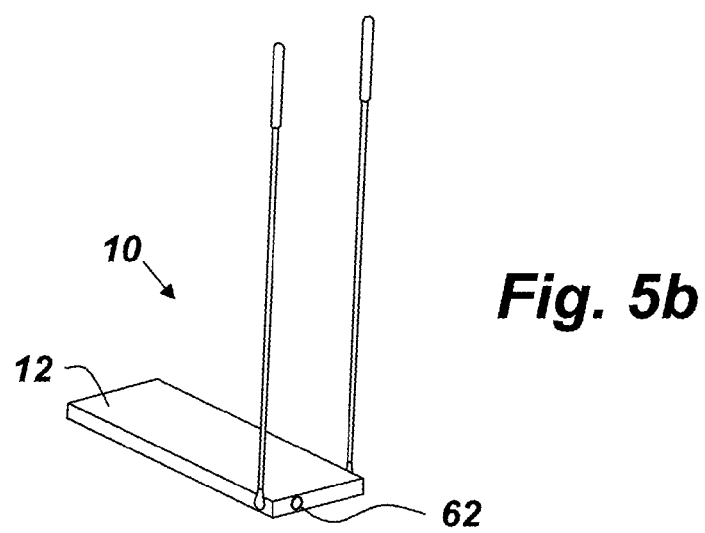
FIG. 5(b) is a perspective view of an embodiment of the radio relay.

FIG. 5(b) shows how each radio relay 10 may comprise an IrDA window 62 in the housing 12. The radio relay 10 may bi-directionally communicate with its corresponding IrDA transceiver 58 via the IrDA window 62.

Figure 6:
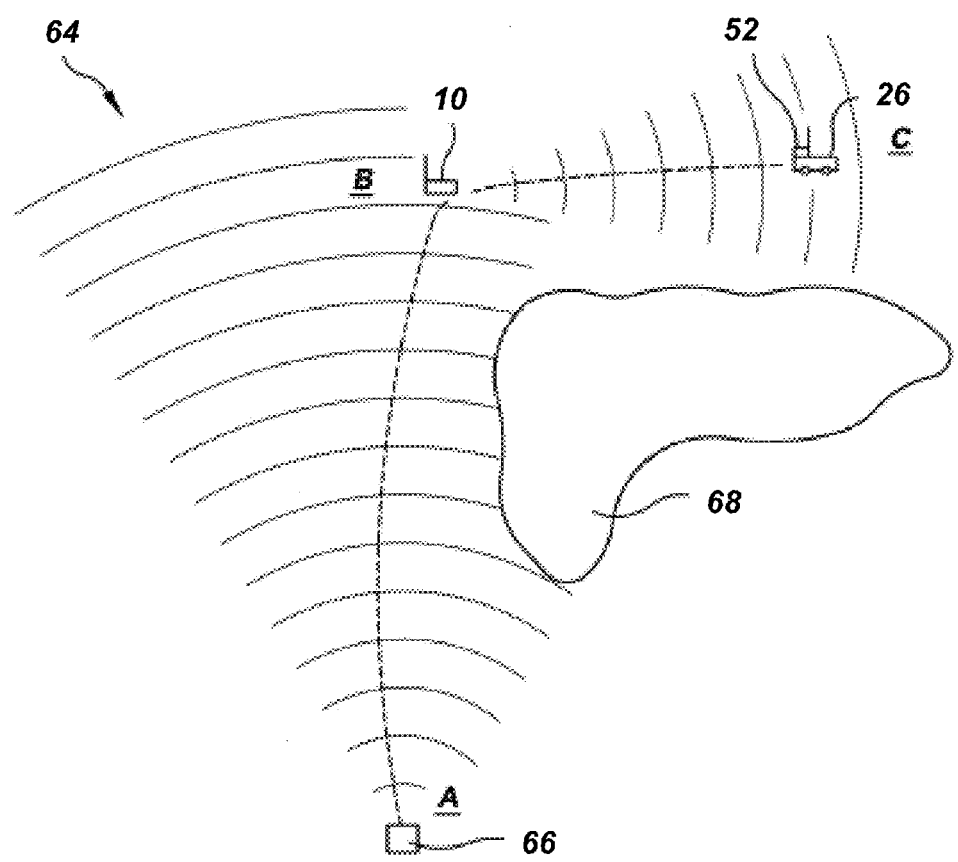
FIG. 6 shows the radio relay operating as a node in a telecommunication network.

FIG. 6 shows how, once deployed, the radio 14 in the radio relay 10 is configured to relay radio frequency (RF) signals and to operate as a node in a telecommunications network 64. Also shown in FIG. 6 are a base station 66, and an obstacle 68. The radio relay 10 may be used to maintain contact between the deployer 52, which is mounted to the mobile platform 26, and the base station 66 in the presence of obstacles 68. The mobile platform 26, traveling from position A towards position B, maintains line of sight (LOS) communications with the base station 66. However, as the mobile platform 26 begins to travel from position B to position C, radio communications begin to be obstructed by obstacle 68. Example embodiments of obstacle 68 include, but are not limited to, buildings, trees, hills, or any other physical or nonphysical obstructions that negatively reflect, distort, and/or absorb radio signals. The base station 66 may be any stationary or mobile site capable of being a node in the network 64. For example, the base station 66 may be, but is not limited to, a vehicle-mounted control center, a man-portable control center, or a control center in a building. FIG. 6 shows how a radio relay 10 may be placed in the vicinity of position B to allow the mobile platform 26 to continue around obstacle 68 towards position C without losing radio connectivity with the base station 66.

The radio relay 10 may be ruggedized such that the radio relay 10 will continue to operate after being dropped from the mobile platform 26 while the mobile platform 26 is in motion. In addition to being built to withstand shock forces, the radio relay 10 may also be constructed to protect against the entry of moisture and contaminants into the housing 12 such that the radio relay 10 may operate in outdoor environments. For example, the radio relay 10 depicted in FIG. 3 has an International Protection Rating (IPR) of at least 64. The radio relay 10 may further comprise a global positioning system (GPS) receiver operatively coupled to the radio 14 such that the housing 12's geo-spatial coordinates may be transmitted to another node in the network 64.

From the above description of the radio relay 10, it is manifest that various techniques may be used for implementing the concepts of radio relay 10 without departing from the scope of the claims. The described embodiments are to be considered in all respects as illustrative and not restrictive. It should also be understood that the radio relay 10 is not limited to the particular embodiments described herein, but is capable of many embodiments without departing from the scope of the claims.

We claim:

1. A radio relay comprising:
   a housing comprising upper and lower surfaces, wherein, after being released from a mobile platform onto a support surface, the housing is configured to come to rest in an initial orientation with either its upper or its lower surface resting on the support surface;

a radio mounted within the housing, wherein the radio is configured to relay radio frequency (RF) signals and to operate as a node in a telecommunications network;

first and second antenna masts, each having a proximal end and a distal end, wherein each proximal end is rotatably coupled to the housing;

first and second antenna elements operatively coupled to the radio and attached to respective distal ends of the first and second antenna masts;

an antenna mast rotation mechanism mounted within the housing and coupled to the proximal ends such that once the housing is in its initial orientation and regardless of whether the housing is resting on its upper or lower surface the antenna mast rotation mechanism is configured to upwardly rotate the first and second antenna masts to a raised position such that the first and second antenna masts are substantially parallel to the ambient gravity vector without changing the orientation of the housing from its initial orientation and regardless of whether or not the support surface is level, and wherein the first and second antenna elements are configured so as to enable antenna diversity operation;

an antenna friction brake operatively coupled to the first and second antenna masts, wherein the antenna friction brake is configured to hold the first and second antenna masts in position once the antenna mast rotation mechanism has positioned the first and second antenna masts to be substantially parallel to the ambient gravity vector; and wherein the radio relay is configured to be released from the mobile platform such that the distal ends of the first and second antenna masts are the first elements of the radio relay to strike the support surface.

2. The radio relay of claim 1, wherein the mobile platform is an unmanned vehicle.

3. The radio relay of claim 2, wherein the first and second antenna elements are operatively coupled to the radio via wires routed through the first and second antenna masts respectively.

4. A radio relay comprising:

a housing having upper and lower surfaces, wherein the housing is geometrically constrained to rest in an initial orientation on either the upper or the lower surface after being ejected from an unmanned vehicle to a support surface;

a radio mounted within the housing;

first and second antenna masts, each antenna mast having a distal and a proximal end, wherein the proximal ends of the first and second antenna masts are rotatably coupled to an exterior of the housing such that the axis of rotation of the first and second antenna masts are parallel to the upper and lower surfaces;

first and second antenna elements attached to the distal ends of the first and second antenna masts respectively, and operatively coupled to the radio;

an antenna mast rotation mechanism mounted within the housing and attached to the proximal ends of the first and second antennas, wherein, no matter which surface the housing is resting on and no matter the angle of inclination of the support surface with respect to the ambient gravity vector, the antenna mast rotation mechanism is configured to upwardly rotate the first and second antenna masts without altering the initial orientation of the housing until the antenna masts are substantially parallel with the ambient gravity vector;

a three-axis accelerometer mounted within the housing and operatively coupled to the antenna mast rotation mechanism; and wherein, after being ejected from the unmanned vehicle, the distal ends of the first and second antenna masts are configured to strike the support surface before the housing.

5. The radio relay of claim 4, wherein the distal ends of the first and second antenna masts are coupled together with a crossbar.

6. The radio relay of claim 5, further comprising a sensor operatively coupled to the radio and attached to the crossbar.

7. The radio relay of claim 6, wherein the sensor is a video camera.

8. The radio relay of claim 7, further comprising a global positioning system (GPS) receiver operatively coupled to the radio such that the housing's geo-spatial coordinates may be transmitted to another node in the network.

* * * * *